United States Patent
Liasi et al.

(10) Patent No.: US 11,766,712 B2
(45) Date of Patent: Sep. 26, 2023

(54) METHOD OF MANUFACTURING A VEHICLE PANEL TO REDUCE DEVIATION BETWEEN PRE-PANELS AND SUBSEQUENT SECONDARY FORMING DIES

(71) Applicant: Ford Global Technologies, LLC, Dearborn, MI (US)

(72) Inventors: Evangelos Liasi, Royal Oak, MI (US); Liang Huang, Troy, MI (US); Yinong Shen, Canton, MI (US); Joon Kang, Troy, MI (US); Rob Vaughn Degenhardt, Belleville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 355 days.

(21) Appl. No.: 17/075,947

(22) Filed: Oct. 21, 2020

(65) Prior Publication Data
US 2022/0118503 A1 Apr. 21, 2022

(51) Int. Cl.
*G06F 30/20* (2020.01)
*B21D 53/88* (2006.01)
(Continued)

(52) U.S. Cl.
CPC .............. *B21D 53/88* (2013.01); *B21D 22/00* (2013.01); *G06F 30/20* (2020.01); *G06F 30/23* (2020.01);
(Continued)

(58) Field of Classification Search
CPC ... B21D 53/88; B21D 22/00; Y10T 29/49758; G06F 30/20; G06F 30/23; G06F 2113/24;
(Continued)

(56) References Cited

U.S. PATENT DOCUMENTS

| | | | | |
|---|---|---|---|---|
| 5,946,834 A | * | 9/1999 | Bradley | G09F 1/06 40/124.14 |
| 6,530,255 B1 | * | 3/2003 | Usui | B21D 43/05 72/472 |

(Continued)

FOREIGN PATENT DOCUMENTS

CN 105868428 8/2016

OTHER PUBLICATIONS

W. A. Siswanto, A. D. Anggono, B. Omar, and K. Jusoff, "An Alternate Method to Springback Compensation for Sheet Metal Forming", (referred as Siswanto et al) pp. 1-13, 2014 (Year: 2014).*

(Continued)

*Primary Examiner* — Kibrom K Gebresilassie
(74) *Attorney, Agent, or Firm* — Burris Law, PLLC

(57) ABSTRACT

A method of manufacturing a panel using an initial die and a series of secondary dies includes sequentially defining multi-dimensional models for the series of secondary dies. The method includes simulating a geometry of an $n^{th}$ pre-panel, defining a multi-dimensional model of the $n^{th}$ secondary die based on the simulated geometry of the $n^{th}$ pre-panel, simulating operation of the $n^{th}$ secondary die on the $n^{th}$ pre-panel to determine geometry of an $(n+1)^{th}$ pre-panel, and determining a deviation between the simulated $(n+1)^{th}$ pre-panel and a target pre-panel geometry. If the deviation is outside tolerance, the method includes iteratively: adjusting the multi-dimensional model of the $n^{th}$ secondary die, simulating operation thereof to determine an adjusted simulated geometry of the $(n+1)^{th}$ pre-panel, and determining a deviation between the adjusted simulated geometry of the $(n+1)^{th}$ pre-panel and the target $(n+1)^{th}$ pre-panel, until the deviation is within the tolerance limit.

20 Claims, 4 Drawing Sheets

(51) Int. Cl.
*G06F 30/23* (2020.01)
*G06F 113/24* (2020.01)
*B21D 22/00* (2006.01)
*G06F 111/00* (2020.01)
*G06F 30/25* (2020.01)
*G06F 30/28* (2020.01)
*G06F 30/27* (2020.01)

(52) U.S. Cl.
CPC .............. *G06F 30/25* (2020.01); *G06F 30/27* (2020.01); *G06F 30/28* (2020.01); *G06F 2111/00* (2020.01); *G06F 2113/24* (2020.01); *Y10T 29/49758* (2015.01)

(58) Field of Classification Search
CPC .......... G06F 30/25; G06F 30/27; G06F 30/28; G06F 2111/00; G06F 2119/22
See application file for complete search history.

(56) References Cited

U.S. PATENT DOCUMENTS

| | | | |
|---|---|---|---|
| 9,008,813 B2 | 4/2015 | Xua et al. | |
| 9,875,495 B2* | 1/2018 | Cole | G06Q 30/0603 |
| 10,303,822 B2 | 5/2019 | Zhu et al. | |
| 10,500,629 B2* | 12/2019 | Roth | B21D 31/005 |
| 2005/0091825 A1* | 5/2005 | Fuks | B21K 21/00 |
| | | | 29/463 |
| 2006/0122726 A1* | 6/2006 | Bergstrom | B21D 7/12 |
| | | | 700/165 |
| 2013/0268243 A1* | 10/2013 | Shen | G06F 30/17 |
| | | | 703/1 |
| 2016/0048619 A1* | 2/2016 | Dalton | G05B 19/4097 |
| | | | 700/98 |
| 2016/0169791 A1* | 6/2016 | Oetjens | G01N 19/08 |
| | | | 702/48 |
| 2016/0196361 A1* | 7/2016 | Viswanathan | B23P 15/24 |
| | | | 703/8 |
| 2017/0178400 A1* | 6/2017 | Boulkenafed | G06T 1/60 |
| 2018/0285487 A1 | 10/2018 | Wilcox et al. | |
| 2019/0366408 A1* | 12/2019 | Ma | B21D 22/022 |
| 2020/0115026 A1* | 4/2020 | Cominsky | E04C 2/08 |
| 2020/0202053 A1* | 6/2020 | Hermann | G06F 17/13 |
| 2020/0380087 A1* | 12/2020 | Zhu | G06F 30/23 |
| 2021/0086411 A1* | 3/2021 | Rodgers | B32B 27/285 |
| 2022/0100923 A1* | 3/2022 | Sheng | B21D 22/22 |

OTHER PUBLICATIONS

N. Mole, G. CAfuta, B. Stok, "A 3D forming tool optimization method considering springback and thinning compensation" (Herein referred as Mole et al) pp. 1673-1685, 2014 (Year: 2014).*

W. Gan, R. H. Wagoner, "Die Design method for sheet springback", pp. 1097-1113, 2004 (Year: 2004).*

W. A. Siswanto, A.D. Anggono, B. Omar, and K. Jusoff, "An Alternate Method to springkback compensation for Sheet Metal Forming", pp. 1-11. (Year: 2014).*

Zhou, L., Functional Morphing for Manufacturing Process Design, Evaluation and Control, 2010 Doctoral Dissertation presented at The University of Michigan.

* cited by examiner

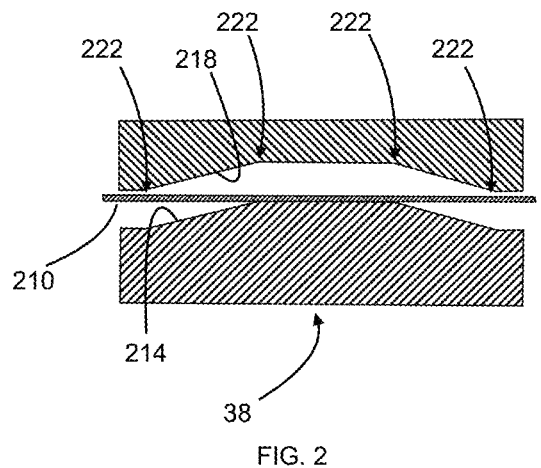
FIG. 2
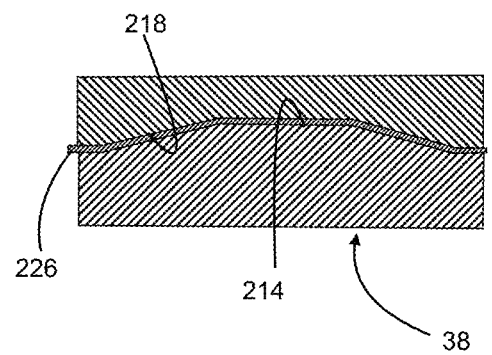
FIG. 3
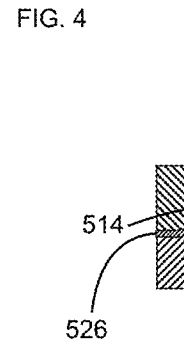
FIG. 4
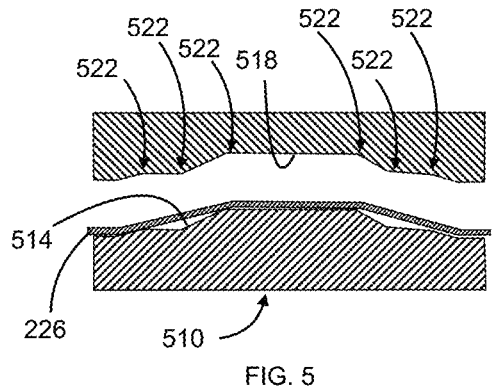
FIG. 5
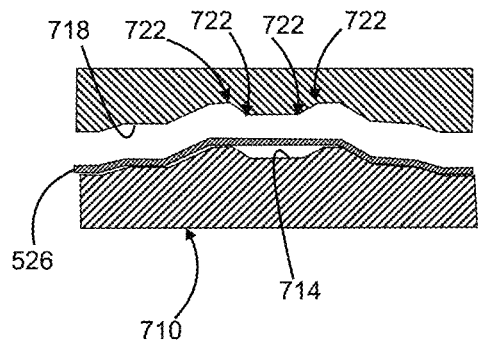
FIG. 7
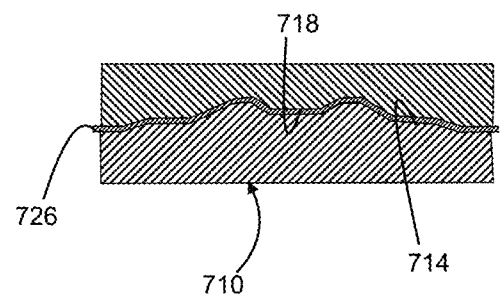
FIG. 6
FIG. 8

METHOD OF MANUFACTURING A VEHICLE PANEL TO REDUCE DEVIATION BETWEEN PRE-PANELS AND SUBSEQUENT SECONDARY FORMING DIES

FIELD

The present disclosure relates to a method of manufacturing a vehicle panel from a series of sheet metal stamping operations.

BACKGROUND

The statements in this section merely provide background information related to the present disclosure and may not constitute prior art.

Stamping is a manufacturing process that typically includes placing a sheet of metal into a stamping press where die surfaces of the press form the sheet metal into a desired shape. Typically, the stamping press includes a stationary tool referred to as a die post that is attached to a press bed. For an automotive panel, the stamping process typically consists of an initial draw die operation, wherein the general shape of a panel results, and one or more secondary stations where secondary forming operations (also referred to as line die operations) where excess material is removed and/or additional forming is performed in order to generate the desired final panel shape. As such, secondary dies can perform secondary trimming and/or forming operations. Typically, the outgoing panel from one station becomes the incoming panel for the next station.

The accuracy of the final panel is determined at least partially by the accuracy of the trim line, which defines where to cut the sheet metal, and the resulting dimensions from any of the forming features (e.g., depressions, flanges, etc.) that are introduced in the secondary forming dies. The accuracy of the final panel is also strongly dependent on how well the incoming panel fits onto the die posts of each secondary station before work is done on the panel at that station.

One of the dominant factors, among others, that affect how well the panel will fit on the posts of the secondary forming dies is the panel springback. Currently, most dies are constructed with a "nominal" die face. In other words, the die face is identical to the product design intent even though the incoming panel does not have this geometry due to gravity, support locations, internal stresses in the panel from the previous operation, etc. This deviation can result in a final panel deviating from the designed geometry and requires additional recuts in rework loops to correct the deviations in the final panel.

The present disclosure addresses these deviations and other issues associated with stamping operations.

SUMMARY

This section provides a general summary of the disclosure and is not a comprehensive disclosure of its full scope or all of its features.

According to one form, a method of manufacturing a vehicle panel using an initial die and a series of secondary dies includes sequentially defining multi-dimensional models for the series of secondary dies, wherein n is based on the number of secondary dies in the series of secondary dies. For an $n^{th}$ secondary die, sequentially defining multi-dimensional models includes: generating a simulated geometry of an $n^{th}$ pre-panel, defining a multi-dimensional model of the $n^{th}$ secondary die based on the simulated geometry of the $n^{th}$ pre-panel, simulating operation of the $n^{th}$ secondary die operating on the $n^{th}$ pre-panel to determine a simulated geometry of an $(n+1)^{th}$ pre-panel, and determining a deviation between the simulated geometry of the $(n+1)^{th}$ pre-panel and a target $(n+1)^{th}$ pre-panel geometry. In response to the deviation being outside a tolerance limit, the method further includes, iteratively, adjusting geometry of the multi-dimensional model of the $n^{th}$ secondary die, simulating operation of the $n^{th}$ secondary die with the adjusted geometry on the $n^{th}$ pre-panel to determine an adjusted simulated geometry of the $(n+1)^{th}$ pre-panel, and determining a deviation between the adjusted simulated geometry of the $(n+1)^{th}$ pre-panel and the target $(n+1)^{th}$ pre-panel geometry, until the deviation is within the tolerance limit. In response to the deviation being within the tolerance, the method further includes storing the multi-dimensional model of the $n^{th}$ secondary die in response.

According to a variety of alternate forms: the method further includes outputting the multi-dimensional models of the series of secondary dies; simulating the $n^{th}$ secondary die operating on the $n^{th}$ pre-panel outputs a deviation vector field; the method further includes converting the deviation vector field to a digital three-dimensional model of an $(n+1)^{th}$ secondary die; the tolerance limit is +/−0.5 mm; the initial die is a draw die; the method further includes forming physical dies from the stored multi-dimensional models of the series of secondary dies; the method further includes sequentially operating the physical dies on a physical sheet of metal until the physical sheet of metal is formed into geometry corresponding to an actual final vehicle panel; simulating the $n^{th}$ secondary die operating on the $n^{th}$ pre-panel includes finite element analysis; the multi-dimensional model of the $n^{th}$ secondary die is generated by a first computer program and the simulating the $n^{th}$ secondary die operating on the $n^{th}$ pre-panel is performed by a second computer program; the method further includes converting an output from the first computer program into a format readable by the second computer program and providing the converted output from the first computer program to the second computer program; the first computer program is finite element analysis software and the second computer program is a Computer Aided Design (CAD) multi-dimensional modeling software; the method further comprising executing a simulation of the initial die operating on a sheet of metal to form an initial pre-panel, wherein the simulation of the initial die operating on the sheet of metal accounts for free state spring back of the sheet of metal and determines the simulated geometry of the $n^{th}$ pre-panel for n=1; the simulation of the initial die operating on the sheet of metal accounts for gravity acting on the sheet of metal; for a first pre-panel, the generated simulated geometry of the first pre-panel corresponds to panel geometry that results from operating the initial die on a sheet of metal; the method further includes physically operating the initial die on a sheet of metal to form an initial pre-panel and scanning the initial pre-panel, wherein when n=1, the simulated geometry of the $n^{th}$ pre-panel is generated based on the scan of the initial pre-panel.

In another form, a method of manufacturing a vehicle panel using an initial die and a series of secondary dies includes: (a) generating a simulated geometry of an $n^{th}$ pre-panel corresponding to a panel geometry that results from operating the initial die on a sheet metal; (b) defining a multi-dimensional model for an $n^{th}$ secondary die based on the simulated geometry of the $n^{th}$ pre-panel, wherein n is based on number of secondary dies; (c) simulating operation of the $n^{th}$ secondary die operating on the $n^{th}$ pre-panel to determine a simulated geometry of an $(n+1)^{th}$ pre-panel; (d) determining a variation between the simulated geometry of the $(n+1)^{th}$ pre-panel and a target $(n+1)^{th}$ pre-panel geometry; (e) adjusting geometry of the multi-dimensional model of the $n^{th}$ secondary die and repeating steps (c) through (e) in response to the deviation being outside of a tolerance limit; and (f) repeating steps (b) through (e) for n=(n+1) to generate a set of multi-dimensional models of the set of secondary dies in response to the deviation being within the tolerance.

According to a variety of alternate forms: generating the simulated geometry of the $n^{th}$ panel further includes operating the initial die on the sheet metal to form a physical pre-panel and scanning the physical pre-panel, and scanning the physical pre-panel to generate the simulated geometry of the $n^{th}$ panel; the method further includes simulating operation of the initial die on the sheet metal to form the $n^{th}$ pre-panel to account for free state spring back of the sheet metal to generate the simulated geometry of the $n^{th}$ pre-panel; step (f) is repeated until final vehicle panel is simulated to be within the tolerance limit in response to the deviation being within the tolerance.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 2 is a schematic cross-sectional view of a portion of a pre-panel between a set of secondary dies of the sequential stamping operations of FIG. 1, illustrating the secondary dies in an open position;

FIG. 3 is a schematic cross-sectional view of the set of secondary dies of FIG. 2, illustrated in a closed position to form a subsequent pre-panel from the pre-panel of FIG. 2;

FIG. 4 is a schematic cross-sectional view of a portion of the subsequent pre-panel of FIG. 3, illustrating spring-back of the pre-panel in dashed lines;

Figure 1:
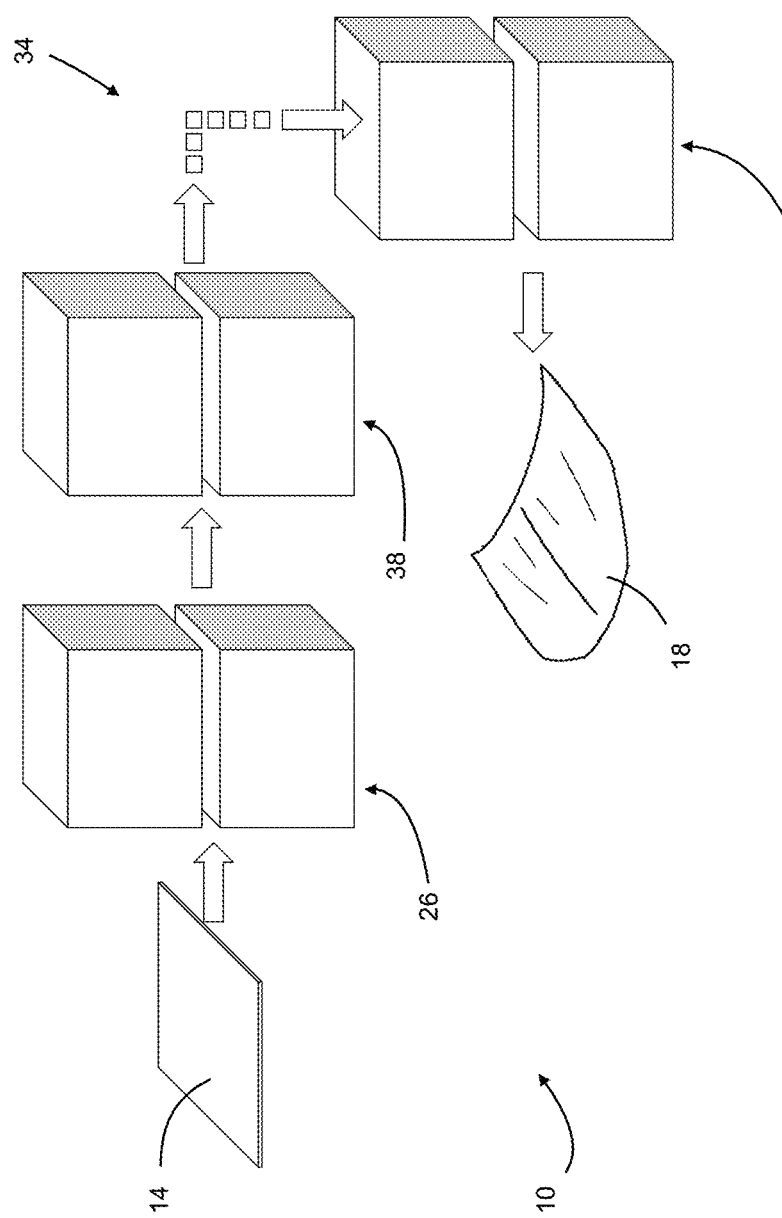
FIG. 1 is a schematic view of a series of sequential stamping operations to form a sheet of metal into a finished panel in accordance with the teachings of the present disclosure.
Figure 9:
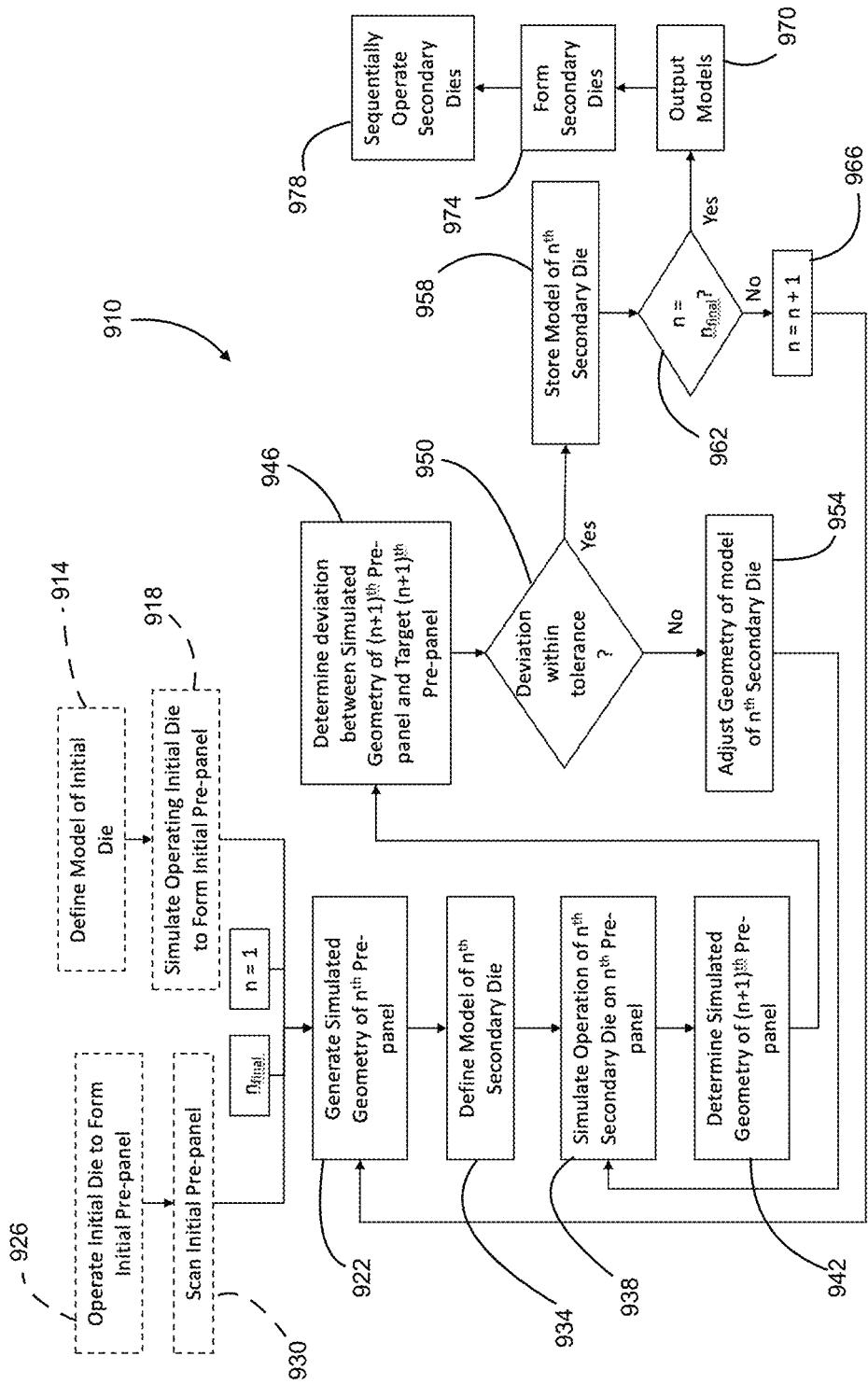
Figure 10:
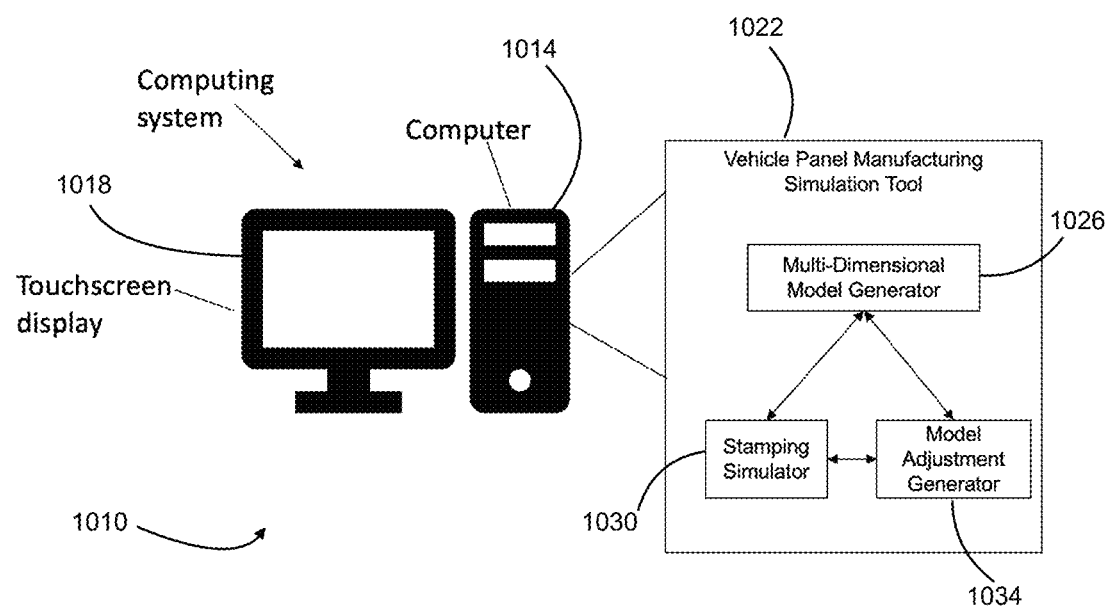

FIG. 5 a schematic cross-sectional view of a portion of a pre-panel output from the set of secondary dies of FIGS. 2 and 3, illustrated between a subsequent set of secondary dies, in an open position, of the sequential stamping operations of FIG. 1;

FIG. 6 is a schematic cross-sectional view of the set of secondary dies of FIG. 5, illustrated in a closed position to form a subsequent pre-panel from the pre-panel of FIG. 5;

FIG. 7 is a schematic cross-sectional view of a portion of a pre-panel output from the set of secondary dies of FIG. 6, illustrated between a subsequent set of secondary dies, in an open position, of the sequential stamping operations of FIG. 1;

FIG. 8 is a schematic cross-sectional view of the set of secondary dies of FIG. 7, illustrated in a closed position to form a finished vehicle panel from the pre-panel of FIG. 7;

FIG. 9 is a flowchart of a method of manufacturing a vehicle panel in accordance with the teachings of the present disclosure; and FIG. 10 is a schematic view of an example system for use in the method of FIG. 9.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Referring to FIG. 1, a series of sequential stamping operations 10 to form a sheet 14 of metal ("sheet metal 14") into a finished vehicle panel 18 is illustrated. The series of sequential stamping operations 10 starts with a first die station in which the sheet metal 14 is inserted between a set of initial dies 26. The initial dies 26 can perform a draw, trim, or combination draw and trim operation to form an initial pre-panel (not specifically shown in FIG. 1). The initial pre-panel may have the general shape of the finished vehicle panel 18, but without various features such as protrusions, indents, flanges, etc. produced by sequential secondary die stations 34 having sets of secondary dies. In the example provided, the sequential sets of secondary die stations 34 includes a first station with a set of initial secondary dies 38, a final station with a set of final secondary dies 42, and a predetermined number of intermediate stations with intermediate secondary dies (not specifically shown) sequentially between the initial secondary dies 38 and the final secondary dies 42. The secondary dies can perform any suitable secondary forming operations such as secondary draw, trim, or combinations of draw and trim operations, for example. In the example provided, the finished vehicle panel 18 is a hood of an automobile, though other types of vehicle panels can be formed, such as door panels, body panels, roof panels, for example. Thus, the term "pre-panel" refers to a panel in the state after the initial dies 26 but before the final secondary dies 42 perform work on it. In other words, "pre-panel" refers to the panel before being the finished vehicle panel 18. Accordingly, the initial pre-panel (e.g., n=1, in the method described below) is the outgoing panel from the initial dies 26 and the incoming panel for the initial secondary dies 38. Likewise, the second pre-panel (e.g., n=2, in the method described below) is the outgoing panel from the initial secondary dies 38 and the incoming panel for the second set of secondary dies (not specifically shown in FIG. 1). Thus, the $n^{th}$ pre-panel is the outgoing panel from the $(n-1)^{th}$ secondary dies and the incoming panel for the $n^{th}$ secondary dies, wherein n is based on the number of secondary dies with $n_{final}$ is the final secondary dies 42.

Referring to FIGS. 2 and 3, a portion of an initial pre-panel 210 (i.e., the outgoing panel from the initial dies 26 and the incoming panel for the initial secondary dies 38 of FIG. 1) is illustrated in cross-section between a portion of the initial secondary dies 38. The initial secondary dies 38 include a lower die face 214 and an upper die face 218 that define surface contours (e.g., bends 222) to be stamped into the initial pre-panel 210 to form a subsequent pre-panel 226, which is the second pre-panel (e.g., n=2) in this example and is the outgoing panel of the initial secondary dies 38 (e.g., n=1 dies) and the incoming panel for the next set of dies (e.g., n=2 dies). Additionally, or alternatively, secondary trim operations can be done by the secondary dies 38. FIG. 2 illustrates the initial secondary dies 38 in an open position and FIG. 3 illustrates the initial secondary dies 38 in a closed position.

Referring to FIG. 4, after the initial secondary dies 38 return to the open position and the subsequent pre-panel 226 is removed, the bends 222 in the subsequent pre-panel 226 can be different (as shown in dashed lines in FIG. 4) relative to their positions when the initial secondary dies 38 were closed (as shown in solid lines in FIG. 4). This difference can be due to factors such as spring back (e.g., internal stress) as well as gravity acting on the part once it is in its free state (i.e., no longer supported by the initial secondary dies 38.

Referring to FIGS. 5 and 6, a portion of the subsequent pre-panel 226 (i.e., the outgoing panel of the initial secondary dies 38 of FIGS. 2 and 3) is illustrated in cross-section between a portion of subsequent secondary dies 510. The secondary dies 510 include a lower die face 514 and an upper die face 518 that define surface contours (e.g., bends 522) to be stamped into the subsequent pre-panel 226 to form yet another subsequent pre-panel 526, which is the third pre-panel (e.g., n=3) in this example and is the outgoing panel of the second secondary dies 38 (e.g., n=2 dies) and the incoming panel for the next set of dies (e.g., n=3 dies). Additionally or alternatively, secondary trim operations can be done by the secondary dies 510. FIG. 5 illustrates the secondary dies 510 in an open position and FIG. 6 illustrates the secondary dies 510 in a closed position. Similar to FIG. 4, after the secondary dies 510 return to the open position and the subsequent pre-panel 526 is removed, the bends 522 in the subsequent pre-panel 526 can be different relative to their positions when in the secondary dies 510.

Referring to FIGS. 7 and 8, a portion of the subsequent pre-panel 526 (i.e., the outgoing panel of the secondary dies 510 of FIGS. 5 and 6) is illustrated in cross-section between a portion of subsequent secondary dies 710. The secondary dies include a lower die face 714 and an upper die face 718 that define surface contours (e.g., bends 722) to be stamped into the subsequent pre-panel 526 to form the finished vehicle panel 18. Additionally, or alternatively, secondary trim operations can be done by the secondary dies 710. While the input of the secondary dies 710 is described as being the output of the secondary dies 510 of FIGS. 5 and 6, additional sets of secondary dies (e.g., $n^{th}$ secondary dies, not specifically shown) can be used sequentially between the secondary dies 510 (FIGS. 5 and 6) and the secondary dies 710 to form additional bends (not specifically shown). FIG. 7 illustrates the secondary dies 710 in an open position and FIG. 8 illustrates the secondary dies 710 in a closed position. Similar to FIG. 4, after the secondary dies 710 return to the open position and the subsequent finished vehicle panel 18 is removed, the bends 722 in the finished vehicle panel 18 can be different relative to their positions when in the secondary dies 710.

Referring to FIG. 9, a method 910 of manufacturing a vehicle panel is illustrated in flowchart form. In one form, the method 910 begins with step 914 at which a model of the initial dies 26 (FIG. 1) is defined. The model of the initial dies 26 is a multi-dimensional (e.g., three-dimensional) computerized (e.g., digital) model of the initial dies 26. In one form, the model of the initial dies 26 are developed in a computer aided design (CAD) software program to be a three-dimensional CAD model of the initial dies 26 or at least the die faces of the initial dies 26.

The method then proceeds, at step 918, to simulate operation of the initial dies 26 on the sheet metal 14 to form the initial pre-panel 210 using finite element analysis (FEA). In one form, the geometry of the die faces of the initial dies 26 are exported from the CAD software to a format usable by a separate FEA software program and then imported into the FEA software program. Parameters, such as material properties of the sheet metal 14 and the initial dies 26, can also be input into the FEA software program. The FEA software can take into account spring back of the sheet metal 14 and may take into account other parameters such as gravity acting on the sheet metal 14. In another form, the physical faces of the initial dies 26 can be scanned and converted into a format usable by the FEA software and imported therein.

At step 922, the method generates simulated geometry of the initial pre-panel 210 (i.e., $n^{th}$ pre-panel when n=1) using the FEA software. The initial pre-panel 210 is the geometry of the sheet metal 14 that results from the operation of the initial dies 26 at step 918. The geometry used by and output by the FEA software may be in a form not directly usable by the CAD software and may be of a relatively lower resolution of the geometry needed for a CAD model suitable for manufacturing physical dies. As such, the geometry of the initial pre-panel 210 can be converted into geometry for use by the CAD software.

In an alternative configuration, instead of steps 914 and 918, physical initial dies 26 can be operated to form the actual initial pre-panel 210 at step 926. At step 930, the initial pre-panel 210 can be removed from the initial dies 26 and scanned (i.e., using any suitable multi-dimensional scanner (e.g., three-dimensional scanner), such as a laser scanner, white light scanner, blue light scanner, contact scanner, photogrammetry scanner, among others. The scanned initial pre-panel 210 of step 930 is then used at step 922 to generate the simulated geometry of the initial pre-panel 210. Steps 914 and 918 and steps 926 and 930 are alternatives for arriving at the simulated geometry of the initial pre-panel and are, thus, shown in FIG. 9 by dashed lines.

At step 934, a model of the initial secondary dies 38 (i.e., $n^{th}$ secondary die where n=1) is defined. The model can be defined by the CAD software. The model of the initial secondary dies 38 is defined based on the simulated geometry of the initial pre-panel 210 and the geometry of the target subsequent pre-panel. The geometry of the initial secondary dies 38 is then converted into a format usable by the FEA software and imported into the FEA software.

At step 938, operation of the initial secondary dies 38 on the initial pre-panel 210 to form the subsequent pre-panel is simulated. The operation can be simulated by the FEA software.

At step 942, simulated geometry of the subsequent or, in this example, the second pre-panel 226 (i.e., $(n+1)^{th}$ pre-panel) is generated. The simulated geometry of the subsequent pre-panel 226 can be generated by the FEA software. The subsequent pre-panel 226 is the geometry of the sheet metal 14 that results from the simulated operation of the initial secondary dies 38 at step 938.

At step 946, the deviation between the simulated geometry of the subsequent pre-panel 226 and the geometry of a target subsequent pre-panel is determined. This deviation can be determined by the FEA software. In one form, the deviation is output as a deviation vector field.

At step 950, the deviation is checked to determine if it is within predetermined acceptable tolerance limits. If the deviation is not within acceptable tolerance limits, then the method proceeds to step 954. For example, the deviation vector field can be checked to determine if any of the vectors therein exceed tolerances.

At step 954, the geometry of the model of the $n^{th}$ secondary die, the initial secondary dies 38 in this particular example, is adjusted based on the deviation. In one form, the deviation vector field can be converted to a digital three-dimensional model. In one form, the vector field can be converted by digitized morphing. The conversion may also include manually morphing the digitized model based on experience or other criteria. The model of the $n^{th}$ secondary die can be adjusted using the CAD software based on the deviation. The adjustment can be done using morphing techniques such as those described in "Functional Morphing for Manufacturing Process Design, Evaluation, and Control," by Liang Zhou, 2010, the entirety of which is incorporated herein by reference. As such, the adjustment can take into account the geometry of the target subsequent pre-panel, the geometry of the $n^{th}$ secondary die, the geometry of the simulated geometry of the subsequent pre-panel 226, and the material properties. After adjustment, the method can return to step 938.

Steps 938, 942, 946, and 950 are then repeated using the adjusted $n^{th}$ secondary die on the $n^{th}$ pre-panel. The steps 938, 942, 946, and 950 are repeated, iteratively adjusting the geometry of the $n^{th}$ secondary die at step 954, until the deviation is within tolerance limits. In one form, the tolerance limits can be +/−0.5 millimeters, though other limits can be used.

Once the deviation is within tolerance limits, the method 910 proceeds to step 958. At step 958, the geometry of the $n^{th}$ secondary die is stored such as being saved to a digital storage device (not shown). At step 958, the geometry of the $n^{th}$ secondary die can be stored in the format of the three-dimensional model used by the CAD software. The method then proceeds to step 962.

At step 962, if the $n^{th}$ secondary die is not the final secondary die (e.g., $n \neq n_{final}$, where $n_{final}$ is the number of total secondary dies), then n is incremented at step 966 and the method 910 returns to step 922 to iteratively define the model of the next secondary die in the sequential set of secondary dies 34. Each model of each secondary die in the sequential set of secondary dies 34 is iteratively determined as described above until the simulated geometry of the finished vehicle panel (e.g., finished vehicle panel 18) is within tolerances and the corresponding models of all secondary dies have been stored.

The method 910 can then proceed to step 970. At step 970, the stored models of the secondary dies are output and then, at step 974, the secondary dies are physically formed. The method 910 proceeds to step 978 in which the secondary dies can be sequentially operated on the initial pre-panel 210 until the finished vehicle panel 18 is produced.

Referring to FIG. 10, an example system 1010 for use in the method of FIG. 9 is schematically illustrated. The system 1010 can include a computer 1014 and at least one input/output device 1018 configured for communication with to the computer 1014. While the input output device 1018 is illustrated as a touch screen display, the input/output device 1018 can include a display screen and separate input devices such as a mouse and keyboard, for example. The computer 1014 includes a vehicle panel manufacturing simulation tool 1022. The vehicle panel manufacturing simulation tool 1022 include one or more digital programs that can be executed by the computer 1014. The vehicle panel manufacturing simulation tool 1022 can be stored on a memory device (not specifically shown) within the computer 1014. The computer 1014 can be located remotely from the input/output device 1018.

In the example provided, the vehicle panel manufacturing simulation tool 1022 includes a multi-dimensional model generator 1026, a stamping simulator 1030, and a model adjustment generator 1034. In one form, the multi-dimensional model generator 1026, the stamping simulator 1030, and the model adjustment generator 1034 are separately executable digital programs. In another form, the multi-dimensional model generator 1026, the stamping simulator 1030, and the model adjustment generator 1034 can be separate modes within a common digital program. In yet another form, the multi-dimensional model generator 1026 and the stamping simulator 1030 can be separate modes within a common digital program and the model adjustment generator 1034 can be a separately executable digital program. In still another form, the multi-dimensional model generator 1026 and the model adjustment generator 1034 can be modes within a common digital program and the stamping simulator 1030 can be a separately executable digital program.

The computer 1014 is configured to operate vehicle panel manufacturing simulation tool 1022 in accordance with the method of FIG. 9 described above. The multi-dimensional model generator 1026 is configured generate the models described above with reference to steps 914, 922, 934, 958, and 970, for example. The stamping simulator 1030 can be an FEA program and can simulate operation of the dies and output the deviation vector field as described above with reference to steps 918, 938, 942, and 946, for example. The model adjustment generator 1034 can adjust the models as described above with reference to step 954, for example. The vehicle panel manufacturing simulation tool 1022 can be configured to determine if the deviation is within tolerance at step 950, can store the models at step 958, can determine whether the final secondary die has been stored at step 962, and can output the models at step 970.

The method of the present disclosure reduces deviations between the actual secondary pre-panels and the target secondary pre-panels such that the actual secondary pre-panels seat or nest more fully on the following secondary die. The improved fit between the actual secondary pre-panels and their corresponding subsequent secondary dies increases the accuracy of the secondary features formed by those subsequent secondary dies. Thus, scrap and rework of secondary dies can be reduced. Accordingly, the method of the present disclosure can reduce development time, while decreasing deviations between the finished vehicle panel and the target finished vehicle panel.

As used herein, the term "model" refers to a multi-dimensional computerized (e.g., digital) model. As used herein, the term "finished vehicle panel" refers to the panel following the final stamping operation, though additional operations such as machining, bending, grinding, punching, drilling, welding, coating, painting, and other operations may still be done before the panel is installed on a vehicle.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A method of manufacturing a vehicle panel using an initial die and a series of secondary dies, the initial die being configured to perform an initial bend on a workpiece and each secondary die of the series of secondary dies being configured to perform a subsequent bend on the same workpiece to achieve the vehicle panel from the workpiece, the method comprising:
sequentially defining multi-dimensional models for the series of secondary dies, wherein n is based on a total number of secondary dies in the series of secondary dies, wherein for an $n^{th}$ secondary die, sequentially defining multi-dimensional models comprises:
generating a simulated geometry of an $n^{th}$ pre-panel;
defining a multi-dimensional model of the $n^{th}$ secondary die based on the simulated geometry of the $n^{th}$ pre-panel;
simulating operation of the $n^{th}$ secondary die operating on the $n^{th}$ pre-panel to determine a simulated geometry of an $(n+1)^{th}$ pre-panel;
determining a deviation between the simulated geometry of the $(n+1)^{th}$ pre-panel and a target $(n+1)^{th}$ pre-panel geometry;
in response to the deviation being outside a tolerance limit, iteratively: adjusting geometry of the multi-dimensional model of the $n^{th}$ secondary die, simulating operation of the $n^{th}$ secondary die with the adjusted geometry on the $n^{th}$ pre-panel to determine an adjusted simulated geometry of the $(n+1)^{th}$ pre-panel, and determining a deviation between the adjusted simulated geometry of the $(n+1)^{th}$ pre-panel and the target $(n+1)^{th}$ pre-panel geometry, until the deviation is within the tolerance limit; and
storing the multi-dimensional model of the $n^{th}$ secondary die in response to the deviation being within the tolerance.

2. The method according to claim 1 further comprising outputting the multi-dimensional models of the series of secondary dies.

3. The method according to claim 1, wherein simulating the $n^{th}$ secondary die operating on the $n^{th}$ pre-panel outputs a deviation vector field.

4. The method according to claim 3 further comprising converting the deviation vector field to a digital three-dimensional model of an $(n+1)^{th}$ secondary die.

5. The method according to claim 1, wherein the tolerance limit is +/−0.5 mm.

6. The method according to claim 1, wherein the initial die is a draw die.

7. The method according to claim 1 further comprising forming physical dies from the stored multi-dimensional models of the series of secondary dies.

8. The method according to claim 7 further comprising sequentially operating the physical dies on a physical sheet of metal until the physical sheet of metal is formed into geometry corresponding to an actual final vehicle panel.

9. The method according to claim 1, wherein simulating the $n^{th}$ secondary die operating on the $n^{th}$ pre-panel includes finite element analysis.

10. The method according to claim 1, wherein the multi-dimensional model of the $n^{th}$ secondary die is generated by a first computer program and the simulating the $n^{th}$ secondary die operating on the $n^{th}$ pre-panel is performed by a second computer program.

11. The method according to claim 10 further comprising converting an output from the first computer program into a format readable by the second computer program and providing the converted output from the first computer program to the second computer program.

12. The method according to claim 11, wherein the first computer program is finite element analysis software and the second computer program is a computer aided design (CAD) multi-dimensional modeling software.

13. The method according to claim 1 further comprising executing a simulation of the initial die operating on a sheet of metal to form an initial pre-panel, wherein the simulation of the initial die operating on the sheet of metal accounts for free state spring back of the sheet of metal and determines the simulated geometry of the $n^{th}$ pre-panel for n=1.

14. The method according to claim 13, wherein the simulation of the initial die operating on the sheet of metal accounts for gravity acting on the sheet of metal.

15. The method according to claim 1, wherein for a first pre-panel, the generated simulated geometry of the first pre-panel corresponds to panel geometry that results from operating the initial die on a sheet of metal.

16. The method according to claim 1 further comprising physically operating the initial die on a sheet of metal to form an initial pre-panel and scanning the initial pre-panel, wherein when n=1, the simulated geometry of the $n^{th}$ pre-panel is generated based on the scan of the initial pre-panel.

17. A method of manufacturing a vehicle panel using an initial die and a series of secondary dies, the initial die being configured to perform an initial bend on a workpiece and each secondary die of the series of secondary dies being configured to perform a subsequent bend on the same workpiece to achieve the vehicle panel from the workpiece, the method comprising:
(a) generating a simulated geometry of an $n^{th}$ pre-panel corresponding to a panel geometry that results from operating the initial die on a sheet metal;
(b) defining a multi-dimensional model for an $n^{th}$ secondary die based on the simulated geometry of the $n^{th}$ pre-panel, wherein n is based on number of secondary dies;
(c) simulating operation of the $n^{th}$ secondary die operating on the $n^{th}$ pre-panel to determine a simulated geometry of an $(n+1)^{th}$ pre-panel;
(d) determining a variation between the simulated geometry of the $(n+1)^{th}$ pre-panel and a target $(n+1)^{th}$ pre-panel geometry;
(e) adjusting geometry of the multi-dimensional model of the $n^{th}$ secondary die and repeating steps (c) through (e) in response to the deviation being outside of a tolerance limit; and
(f) repeating steps (b) through (e) for n=(n+1) to generate a set of multi-dimensional models of the set of secondary dies in response to the deviation being within the tolerance.

18. The method according to claim 17, wherein generating the simulated geometry of the $n^{th}$ panel further comprises:

operating the initial die on the sheet metal to form a physical pre-panel and scanning the physical pre-panel; and scanning the physical pre-panel to generate the simulated geometry of the $n^{th}$ panel.

19. The method according to claim 17 further comprising simulating operation of the initial die on the sheet metal to form the $n^{th}$ pre-panel to account for free state spring back of the sheet metal to generate the simulated geometry of the $n^{th}$ pre-panel.

20. The method according to claim 17, wherein step (f) is repeated until final vehicle panel is simulated to be within the tolerance limit in response to the deviation being within the tolerance.

* * * * *